(12) United States Patent
Dautenhahn

(10) Patent No.: US 11,389,888 B2
(45) Date of Patent: Jul. 19, 2022

(54) WAVE SOLDER NOZZLE WITH AUTOMATED EXIT WING

(71) Applicant: Illinois Tool Works Inc., Glenview, IL (US)

(72) Inventor: Jonathan M. Dautenhahn, Lake Ozark, MO (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/995,202

(22) Filed: Aug. 17, 2020

(65) Prior Publication Data

US 2022/0048127 A1 Feb. 17, 2022

(51) Int. Cl.
*B23K 3/00* (2006.01)
*B23K 3/06* (2006.01)
*B23K 1/08* (2006.01)
*B23K 101/42* (2006.01)

(52) U.S. Cl.
CPC ............ *B23K 3/0653* (2013.01); *B23K 1/085* (2013.01); *B23K 2101/42* (2018.08)

(58) Field of Classification Search
CPC ....... B23K 1/085; B23K 2101/42; H05K 3/34
USPC .................................................. 228/37, 260
See application file for complete search history.

(56) References Cited

U.S. PATENT DOCUMENTS

| | | | |
|---|---|---|---|
| 3,151,592 A | 10/1964 | Wegener | |
| 3,604,611 A | 9/1971 | Lamberty | |
| 3,993,235 A | 11/1976 | Boynton | |
| 4,447,001 A | 5/1984 | Allen et al. | |
| 4,465,014 A | 8/1984 | Bajka et al. | |
| 4,465,219 A | 8/1984 | Kondo | |
| 4,530,457 A | 7/1985 | Down | |
| 4,530,458 A | 7/1985 | Kondo | |
| 4,566,624 A * | 1/1986 | Comerford | .......... B23K 3/0653 228/180.1 |

(Continued)

FOREIGN PATENT DOCUMENTS

CN 1030292 C 11/1995
CN 1051434 C 4/2000

(Continued)

OTHER PUBLICATIONS

Dietrich, Aaron, "How electric linear actuators improve automation results", Feb. 17, 2015, http://blog.tolomatic.com/bid/77545/how-electric-linear-actuators-improve-automation-results.

(Continued)

*Primary Examiner* — Kiley S Stoner
(74) *Attorney, Agent, or Firm* — Lando & Anastasi, LLP

(57) ABSTRACT

A wave soldering machine includes a housing and a conveyor configured to deliver a printed circuit board through the housing. The wave soldering machine further includes a wave soldering station coupled to the housing. The wave soldering station includes a reservoir of solder material, and a wave solder nozzle assembly configured to create a solder wave. The wave solder nozzle assembly has a nozzle core frame and an exit wing, the exit wing being rotatable about a hinge with respect to the nozzle core frame to adjust a flow of a solder wave. A linear actuator is connected via a linkage to the exit wing to allow the linear actuator to adjust an orientation of the exit wing with respect to the nozzle core frame.

11 Claims, 9 Drawing Sheets

(56) References Cited

U.S. PATENT DOCUMENTS

| | | | |
|---|---|---|---|
| 4,666,077 A * | 5/1987 | Rahn | B23K 1/085 118/410 |
| 4,824,010 A | 4/1989 | Inoue et al. | |
| 4,848,642 A | 7/1989 | Kondo | |
| 4,886,201 A * | 12/1989 | Deambrosio | B23K 3/0653 228/37 |
| RE33,197 E | 4/1990 | Deambrosio | |
| 5,024,370 A * | 6/1991 | Yokota | B23K 1/085 228/180.1 |
| 5,044,542 A | 9/1991 | Deambrosio | |
| 5,121,874 A | 6/1992 | Deambrosio et al. | |
| 5,156,324 A | 10/1992 | Hueste et al. | |
| 5,228,614 A * | 7/1993 | Elliott | B23K 3/0653 228/219 |
| 5,388,752 A * | 2/1995 | Kawakatsu | B23K 1/085 228/20.1 |
| 5,409,159 A | 4/1995 | Connors et al. | |
| 5,411,197 A | 5/1995 | Nakamura et al. | |
| 5,568,894 A | 10/1996 | Gileta | |
| 5,630,542 A | 5/1997 | Hendrikx | |
| 5,772,101 A | 6/1998 | Nishimura et al. | |
| 5,794,837 A | 8/1998 | Cottingham et al. | |
| 6,415,972 B1 | 7/2002 | Leap | |
| 6,431,431 B2 | 8/2002 | Willis et al. | |
| 6,499,650 B2 | 12/2002 | Takano et al. | |
| 6,726,083 B2 | 4/2004 | Leap | |
| 6,732,903 B2 | 5/2004 | Wang et al. | |
| 7,988,031 B2 | 8/2011 | Nakamura et al. | |
| 9,022,275 B2 | 5/2015 | Hsieh | |
| 9,161,459 B2 | 10/2015 | Dautenhahn | |
| 9,198,300 B2 | 11/2015 | Dautenhahn | |
| 9,370,838 B2 | 6/2016 | Hueste | |
| 9,427,819 B2 | 8/2016 | Dautenhahn | |
| 2001/0020637 A1 * | 9/2001 | Zen | B23K 3/0653 228/260 |
| 2001/0030220 A1 * | 10/2001 | Willis | B23K 3/0653 228/37 |
| 2002/0036223 A1 | 3/2002 | Saito | |
| 2002/0179693 A1 | 12/2002 | Kawashima et al. | |
| 2003/0066866 A1 | 4/2003 | Takaguchi et al. | |
| 2003/0116606 A1 * | 6/2003 | Wang | B23K 3/0646 228/32 |
| 2003/0116607 A1 | 6/2003 | Wang et al. | |
| 2004/0211816 A1 | 10/2004 | Ogawa | |
| 2005/0006435 A1 | 1/2005 | Diehm et al. | |
| 2006/0186183 A1 | 8/2006 | Morris | |
| 2010/0059575 A1 | 3/2010 | Isler et al. | |
| 2010/0065610 A1 | 3/2010 | Szymanowski | |
| 2010/0163599 A1 | 7/2010 | Zen et al. | |
| 2011/0226843 A1 | 9/2011 | Yanaros et al. | |
| 2013/0206817 A1 | 8/2013 | Tavares et al. | |
| 2017/0072492 A1 | 3/2017 | Hashimoto et al. | |
| 2018/0111211 A1 | 4/2018 | Dautenhahn et al. | |
| 2019/0039159 A1 | 2/2019 | Suzuki et al. | |

FOREIGN PATENT DOCUMENTS

| | | | |
|---|---|---|---|
| CN | 1620228 A | 5/2005 | |
| CN | 1225154 C | 10/2005 | |
| CN | 1748872 A | 3/2006 | |
| CN | 103111713 A | 5/2013 | |
| CN | 105658366 A | 6/2016 | |
| CN | 106660152 A | 5/2017 | |
| DE | 19541340 A1 | 5/1997 | |
| EP | 0377336 A2 | 7/1990 | |
| JP | 63-242466 A | 10/1988 | |
| JP | H0297956 U | 8/1990 | |
| JP | 2006080439 A | 3/2006 | |
| WO | WO-2010087374 A1 * | 8/2010 | B23K 3/0653 |
| WO | 2015040691 A1 | 3/2015 | |
| WO | 2019240932 A1 | 12/2019 | |

OTHER PUBLICATIONS

Notification of Transmittal of the International Search Report and the Written Opinion of the International Searching Authority from corresponding PCT/US2021/038076 dated Oct. 29, 2021.

* cited by examiner

WAVE SOLDER NOZZLE WITH AUTOMATED EXIT WING

BACKGROUND OF DISCLOSURE

1. Field of Disclosure

The present disclosure relates generally to apparatuses and methods for manufacturing printed circuit boards and for assisting a process of soldering metals to integrated circuit boards, and more particularly to a wave soldering machine and related method having a wave solder nozzle assembly having an automated adjustable exit wing to optimize solder flow over the back of the nozzle.

2. Discussion of Related Art

In the fabrication of printed circuit boards, electronic components can be mounted to a printed circuit board by a process known as "wave soldering." In a typical wave solder machine, a printed circuit board (sometimes referred to as a "PCB") is moved by a conveyor on an inclined path past a fluxing station, a pre-heating station, and finally a wave soldering station. At the wave soldering station, a wave of solder is caused to well upwardly (by means of a pump) through a wave solder nozzle and contact portions of the printed circuit board to be soldered.

Typical wave solder nozzles have exit wings that are manually tilted to increase or decrease the height of the back of the nozzle that controls the solder flow generated by the wave soldering machine. The process of adjusting the solder flow can be difficult and imposes risks to operators tasked with making such adjustments within a solder pot filled with molten solder.

SUMMARY OF DISCLOSURE

One aspect of the disclosure is directed to a wave soldering machine to perform a wave soldering operation on a printed circuit board. In one embodiment, the wave soldering machine comprises a housing, a conveyor coupled to the housing, and a wave soldering station coupled to the housing. The conveyor is configured to deliver a printed circuit board through the housing. The wave soldering station includes a reservoir of solder material, and a wave solder nozzle assembly configured to create a solder wave. The wave solder nozzle assembly has a nozzle core frame and an exit wing. The exit wing is rotatable about a hinge with respect to the nozzle core frame to adjust a flow of a solder wave. The wave solder nozzle assembly further has a linear actuator connected to the exit wing and configured to adjust an orientation of the exit wing with respect to the nozzle core frame.

In some embodiments, the linear actuator is connected to the exit wing by a linkage.

In some embodiments, the exit wing includes a first end coupled by the hinge to the nozzle core frame and a second end, and the linkage includes at least one rotating link having a first end rotatably coupled to the second end of the exit wing and a second end that is rotatably coupled to an actuator arm of the actuator.

In some embodiments, the linkage further includes a cross bar extending perpendicularly to and being rotatably coupled to the at least one rotating link, and at least one connecting link coupling the cross bar to the actuator arm and extending perpendicularly to cross bar.

In some embodiments, the at least one connecting link is connected to the actuator arm by an actuator block.

In some embodiments, the at least one rotating link is two rotating links and the at least one connecting link is two connecting links.

In some embodiments, the wave soldering machine further comprises a controller in communication with the actuator and configured to cause the actuator to adjust the orientation of the exit wing during operation of the wave soldering machine.

In some embodiments, the wave soldering machine further comprises a controller in communication with the actuator and configured to cause the actuator to adjust the orientation of the exit wing during operation of the wave soldering machine.

In some embodiments, the wave soldering machine further comprises a substantially gas impermeable shroud that surrounds the wave soldering station and includes at least one sealed opening through which the at least one connecting link extends, each sealed opening having an inner surface that is in substantial sealing engagement with an outer surface of a respective one of the connecting links.

Another aspect of the disclosure is directed to a wave solder nozzle assembly of a wave soldering station configured to perform a wave soldering operation on a printed circuit board. In one embodiment, the wave solder nozzle assembly comprises a nozzle core frame, an exit wing coupled to the nozzle core frame, the exit wing being rotatable about a hinge with respect to the nozzle core frame to adjust a flow of a solder wave, and a linear actuator connected to the exit wing and configured to adjust an orientation of the exit wing with respect to the nozzle core frame.

In some embodiments, the linear actuator is connected to the exit wing by a linkage.

In some embodiments, the exit wing includes a first end coupled by the hinge to the nozzle core frame and a second end, and wherein the linkage includes at least one rotating link having a first end rotatably coupled to the second end of the exit wing and a second end that is rotatably coupled to an actuator arm of the actuator.

In some embodiments, the linkage further includes a cross bar extending perpendicularly to and being rotatably coupled to the at least one rotating link, and at least one connecting link coupling the cross bar to the actuator arm and extending perpendicularly to cross bar.

In some embodiments, the at least one connecting link is connected to the actuator arm by an actuator block.

In some embodiments, the at least one rotating link is two rotating links and the at least one connecting link is two connecting links.

In some embodiments, the actuator is configured to receive commands from a controller to cause the actuator to adjust the orientation of the exit wing during operation of the wave soldering machine.

In some embodiments, the actuator is configured to receive commands from a controller to cause the actuator to adjust the orientation of the exit wing during operation of the wave soldering machine.

In some embodiments, the wave solder nozzle assembly further comprises a substantially gas impermeable shroud that surrounds the wave soldering station and includes at least one sealed opening through which the at least one connecting link extends, each sealed opening having an inner surface that is in substantial sealing engagement with an outer surface of a respective one of the connecting links.

Another aspect of the disclosure is directed to a method of adjusting a flow of a solder wave of a wave solder nozzle assembly of a wave soldering machine. In one embodiment, the method comprises delivering solder material to a wave solder nozzle assembly including a nozzle core frame and an exit wing hingedly attached to the nozzle core frame, adjusting a flow of the solder wave by a linear actuator connected to the exit wing to adjust an orientation of the exit wing with respect to the nozzle core frame, and performing a wave soldering operation on a printed circuit board.

In some embodiments, adjusting the flow of the solder wave is achieved by rotating the exit wing with respect to the nozzle core frame by a linkage coupled to the linear actuator and the exit wing.

In some embodiments, the method further comprises creating a substantially gas impermeable atmosphere over the solder wave by a shroud that surrounds the wave soldering station that includes the wave solder nozzle assembly, the shroud including at least one sealed opening through which the at least one connecting link of the linkage extends, each sealed opening having an inner surface that is in substantial sealing engagement with an outer surface of a respective one of the connecting links.

In some embodiments, the actuator is coupled to a controller to control the movement of the linear actuator.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
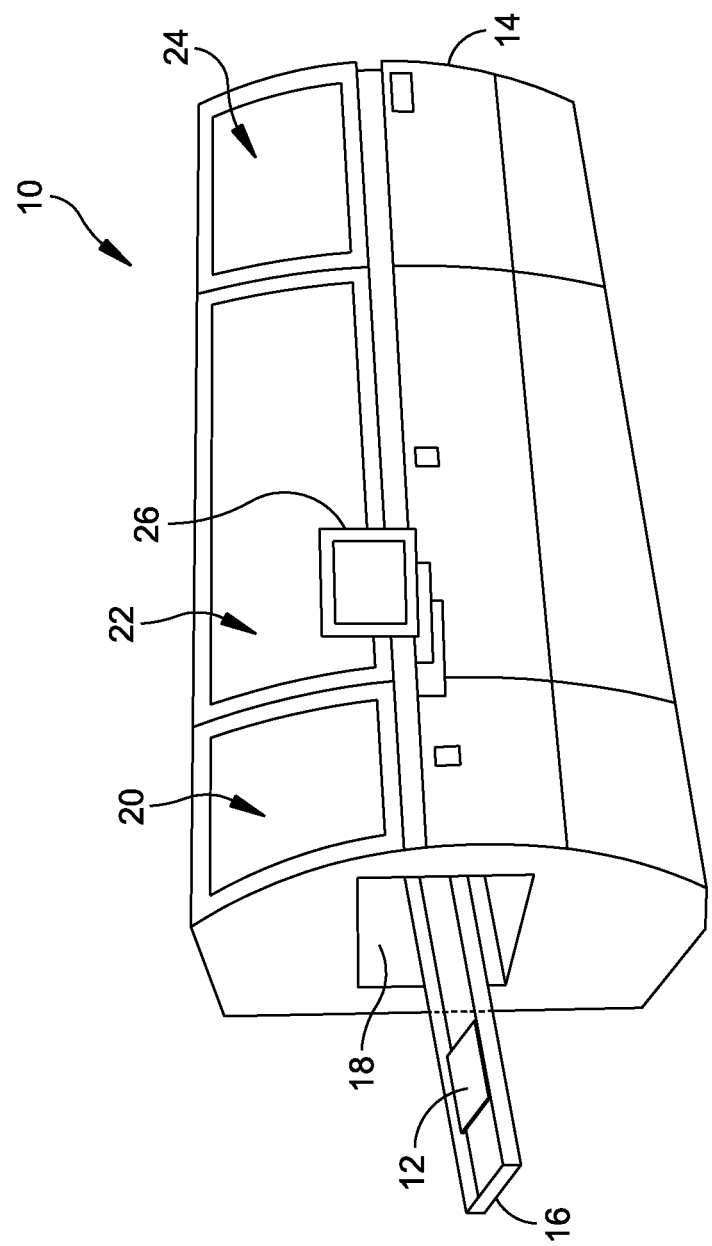
FIG. 1 is a perspective view of a wave solder machine.

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items. The present disclosure provides a wave soldering machine including a wave solder nozzle assembly.

The present disclosure also provides a wave solder nozzle assembly for a wave soldering machine. The wave solder nozzle assembly includes an actuator that is configured for real-time control of an angle of an adjustable exit wing of the wave solder nozzle assembly. The angle of the exit wing affects the flow of a solder wave exiting the wave solder nozzle assembly.

In some embodiments, the actuator is a linear actuator that is coupled to the exit wing to adjust the angle of the exit wing. In some embodiments, the linear actuator includes one or more longitudinally movable actuator arms. Because the actuator arms move in a linear path, the linear actuator can be used in conjunction with a substantially gas impermeable shroud that surrounds the wave solder nozzle assembly. In some embodiments, the shroud is a substantially nitrogen impermeable shroud. In some embodiments, the shroud includes one or more sealed openings, each in sealing engagement with an outer surface of a respective one of the connecting links. In such embodiments, the outer surface of each connecting link has a substantially constant cross section along a length of the respective actuator arm that will pass through the respective sealed opening during use. Thus, the outer surface of the respective connecting link can maintain a seal with the respective sealed opening as the actuator arm is extended and retracted to rotate the exit wing. Such a sealing engagement of the shroud is not possible with rotating actuator arms that would sweep through a plane of the shroud.

Additionally, compared to other means of moving an exit wing, the linear actuator allows for a more compact linkage coupling the actuator arms to the exit wing.

Additionally, compared to other means of moving an exit wing, a controller can be automated to cause the linear actuator to adjust the orientation of the exit wing, thereby eliminating the need for manual intervention to change the orientation of the exit wing. The linear actuator can be controlled to precisely adjust the orientation of the exit wing during operation of the wave solder nozzle assembly.

For purposes of illustration, and with reference to FIG. 1, embodiments of the present disclosure will now be described with reference to a wave solder machine, generally indicated at 10, which is used to perform a solder application on a printed circuit board 12. The wave solder machine 10 is one of several machines in a printed circuit board fabrication/assembly line. As shown, the wave solder machine 10 includes a housing or frame 14 adapted to house the components of the machine. The arrangement is such that a conveyor 16 delivers printed circuit boards to be processed by the wave solder machine 10. Upon entering the wave solder machine 10, each printed circuit board 12 travels along an inclined path (e.g., six degrees with respect to horizontal) along the conveyor 16 through a tunnel 18, which includes a fluxing station, generally indicated at 20, and a pre-heating station, generally indicated at 22, to condition the printed circuit board for wave soldering. Once conditioned (i.e., heated), the printed circuit board 12 travels to a wave soldering station, generally indicated at 24, to apply solder material to the printed circuit board. A controller 26 is provided to automate the operation of the several stations of the wave solder machine 10, including but not limited to the fluxing station 20, the pre-heating station 22, and the wave soldering station 24, in the well known manner.

Figure 2:
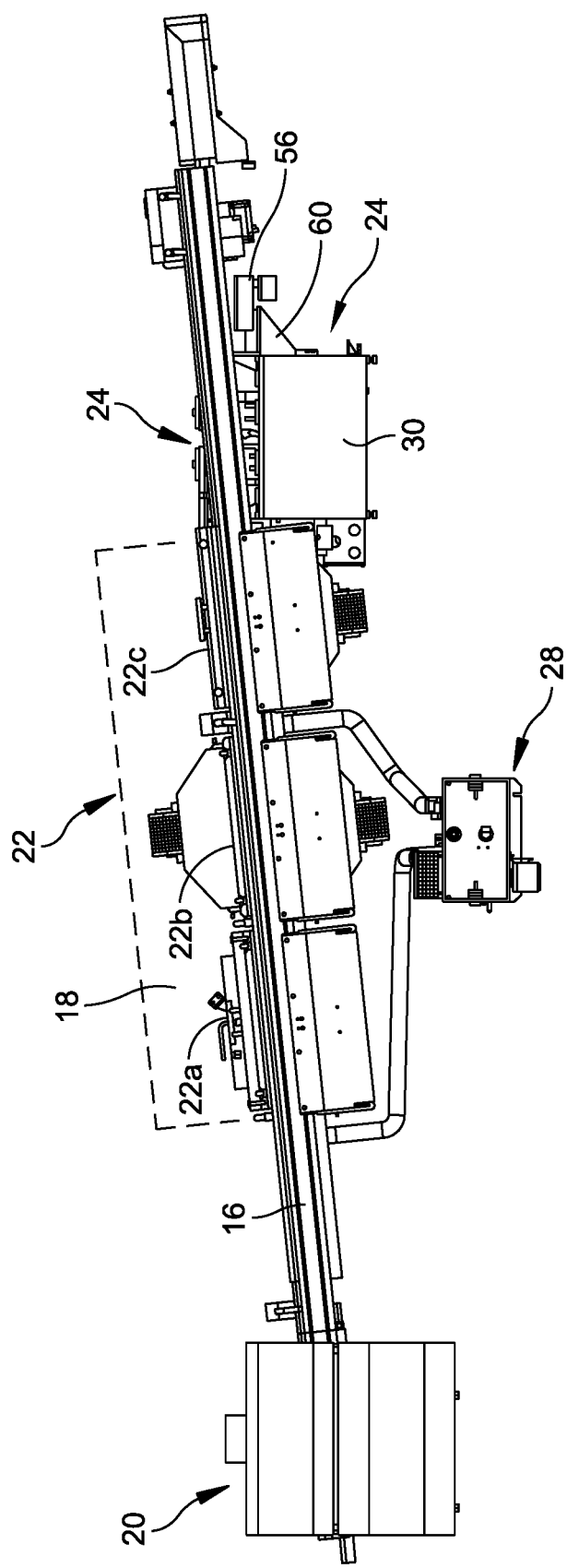
FIG. 2 is a side elevational view of the wave solder machine with external packaging removed to reveal internal components of the wave solder machine.

Referring to FIG. 2, the fluxing station 20 is configured to apply flux to the printed circuit board as it travels on the conveyor 16 through the wave solder machine 10. The pre-heating station includes several pre-heaters (e.g., pre-heaters 22a, 22b and 22c), which are designed to incrementally increase the temperature of the printed circuit board as it travels along the conveyor 16 through the tunnel 18 to prepare the printed circuit board for the wave soldering process. As shown and described in greater detail below, the wave soldering station 24 includes a wave solder nozzle assembly in fluid communication with a reservoir of solder material. A pump is provided within the reservoir to deliver molten solder material to the wave solder nozzle assembly from the reservoir. Once soldered, the printed circuit board exits the wave solder machine 10 via the conveyor 16 to another station provided in the fabrication line, e.g., a pick-and-place machine.

In some embodiments, the wave solder machine 10 further may include a flux management system, generally indicated at 28, to remove volatile contaminants from the tunnel 18 of the wave solder machine. As shown in FIG. 2, the flux management system 28 is positioned below the pre-heating station 22. In one embodiment, the flux management system is supported by the housing 14 within the wave solder machine, and is in fluid communication with the tunnel 18, which is schematically illustrated in FIG. 2. The flux management system 28 is configured to receive contaminated gas from the tunnel 18, treat the gas, and return clean gas back to the tunnel. The flux management system 28 is particularly configured to remove volatile contaminants from the gas, especially in inert atmospheres.

Figure 3:
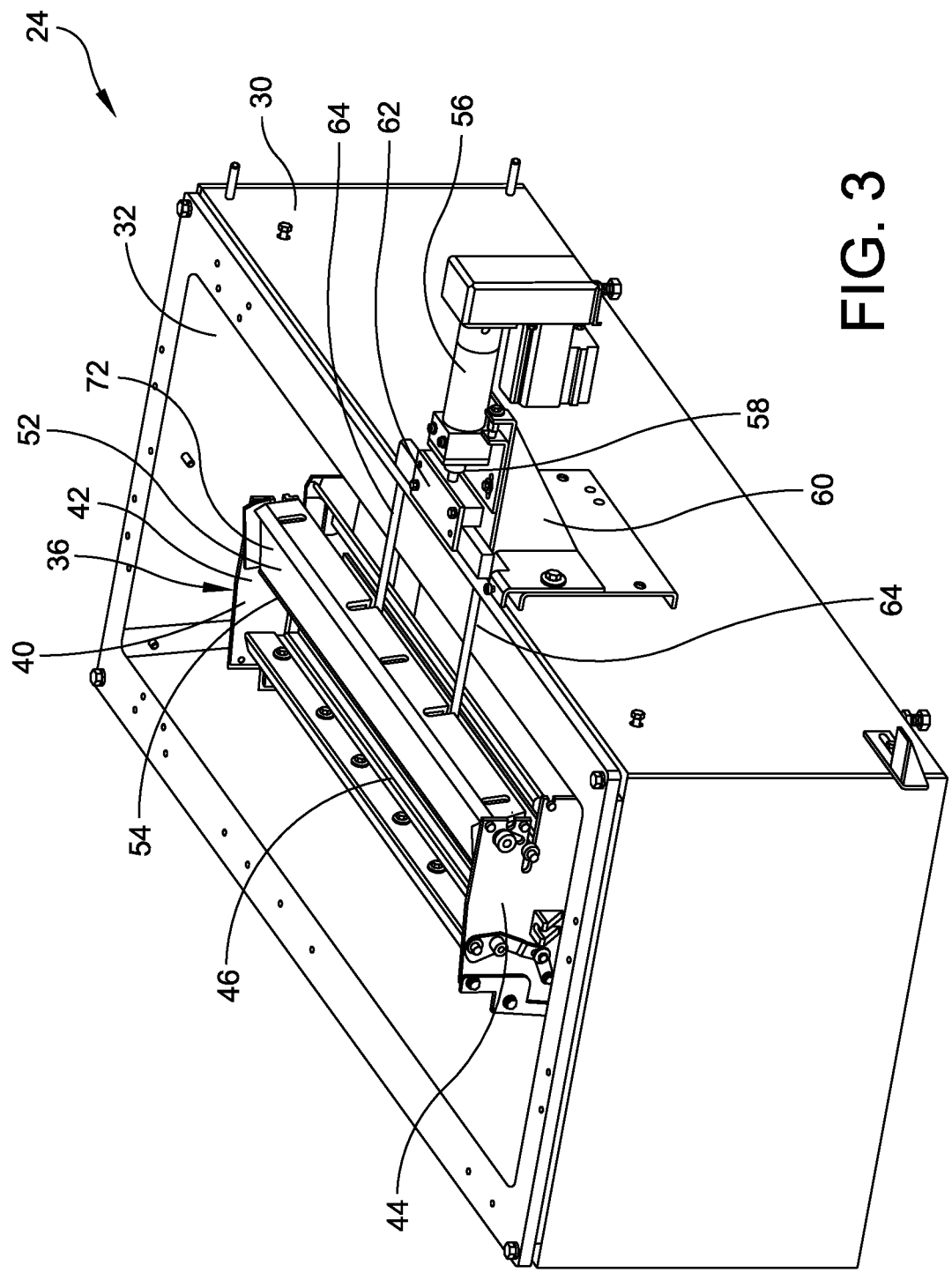
FIG. 3 is a perspective view of the wave soldering station.
Figure 4:
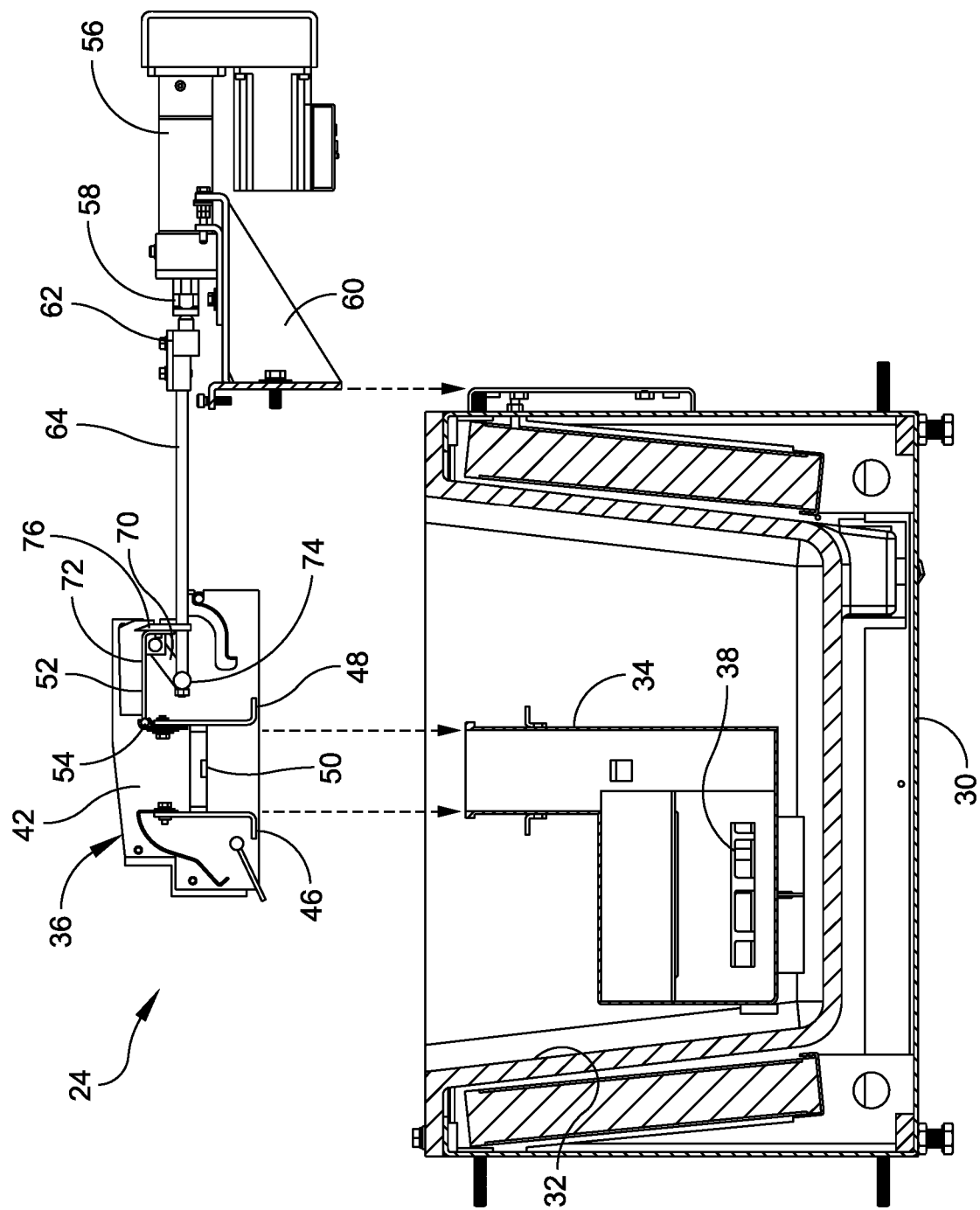
FIG. 4 is an exploded cross-sectional view of the wave soldering station.
Figure 5:
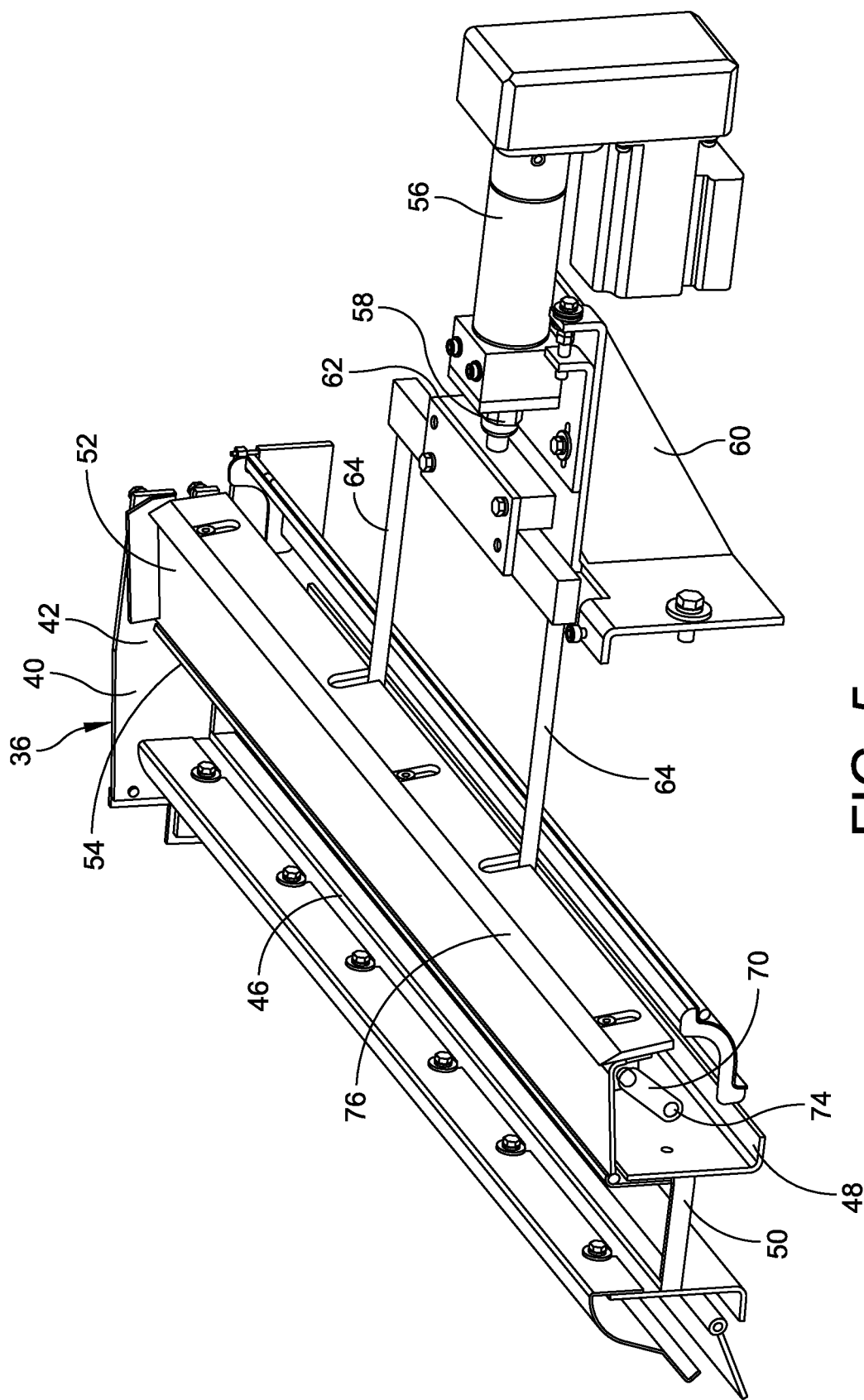
FIG. 5 is an enlarged perspective sectional view of components of the wave soldering station.

Referring additionally to FIGS. 3 and 4, in one embodiment, the wave soldering station 24 includes a solder pot 30 that defines a reservoir 32 configured to contain molten solder. In one embodiment, the solder pot 30 is a box-shaped structure that supports the components of the wave soldering station 24 including a flow duct 34 having two chambers within the reservoir 32. The flow duct 34 is designed to deliver pressurized molten solder to an opening or nozzle of a wave solder nozzle assembly, which is generally indicated at 36. As will be described in greater detail below, the wave solder nozzle assembly 36 is configured to channel the molten solder to the bottom of the printed circuit board 12 and provides for smooth flow of solder back into the reservoir 32. Specifically, the wave solder nozzle assembly 36 is capable of adjusting a flow of the solder wave when performing a wave solder operation.

The wave soldering station 24 further includes a pump impeller 38 positioned within the reservoir 32 of the solder pot 30 adjacent an inlet provided in the flow duct 34. The pump impeller 38 pressurizes the molten solder in the reservoir 32 to pump the molten solder vertically within the flow duct 34 in the reservoir 32 to the wave solder nozzle assembly 36. In one embodiment, the pump impeller 38 is a centrifugal pump that is suitably sized to pump the molten solder to the nozzle of the wave solder nozzle assembly 36. The wave solder nozzle assembly 36 is configured to generate a solder wave that is provided to attach components on the circuit board 12 in the manner described below, and to optimize a dwell time during processing.

Referring to FIGS. 3-7, the wave solder nozzle assembly 36 includes a nozzle core frame 40 having two side walls 42, 44, a first longitudinal support element 46 and a second longitudinal support element 48 that extend between the side walls 42, 44. As shown, the nozzle core frame 40 further may include several cross support elements, each indicated at 50, that extend between the first longitudinal support element 46 and the second longitudinal support element 48. The nozzle core frame 40 also directs the solder flow through a nozzle throat defined between the first and second longitudinal support elements 46, 48.

The nozzle assembly 36 further includes an exit wing 52 to control the solder flow over the back of the nozzle of the solder wave generated by the wave solder machine 10. To allow for an adjustment of the flow of the solder wave exiting the nozzle throat of the nozzle core frame 48, the exit wing 52 is secured to the nozzle core frame 40 by a hinge 54. The exit wing 52 is rotatable about the hinge 54 by an actuator 56 via a linkage. As described in more detail below, the angle of the exit wing 52 relative to the nozzle core frame 40 can be controlled in real-time by controlling the longitudinal displacement of an actuator arm 58 of the actuator 56 and thus the flow of the solder wave over the back of the nozzle to increase or decrease.

The actuator 56 is secured to the solder pot 30 by an actuator support frame 60, which is secured to a side wall of the solder pot 30 by suitable fasteners, such as bolts. The actuator support frame 60 could alternately be secured to the solder pot 30 by another method, such as welding or rivets. As shown, the actuator 56 is secured to the actuator support frame 60, which is configured to support the actuator firmly relative to the solder pot 30. The actuator 56 is positioned next to the wave solder nozzle assembly 36 and forms part of the assembly to adjust an orientation of the exit wing 52 of the wave solder nozzle assembly with respect to the nozzle core frame 40 via the linkage coupled to the exit wing 52 and to the actuator 56. The actuator includes the actuator arm 58 that is coupled to the linkage by an actuator block 62. The linkage is described in more detail below.

In one embodiment, the actuator 56 is a linear actuator, so the actuator arm 58 moves in a longitudinal direction. The actuator block 62 connects the actuator arm 58 to connecting links 64 of the linkage to transfer movement from the actuator arm 58 to the connecting links 64. Thus, longitudinal movement of the actuator arm 58 moves the actuator block 62 and the connecting links 64 in the same longitudinal direction as the actuator arm 58. In some embodiments, the actuator 56 and the connecting links 64 are oriented so the actuator arm 58 moves the connecting links 64 in a horizontal direction. In certain embodiments, the actuator 56 includes an electromechanical actuator that provides movement for the adjustment of the orientation of the exit wing. The actuator 56 is driven by computer controlled machine software (supported by the controller 26) and incorporates an encoder that can relay position indication to the machine software. Via the controller 26, the actuator 56 can be controlled in real-time to achieve a desired orientation of the exit wing 52. The controller is in communication with the actuator and is configured to cause the actuator to adjust the orientation of the exit wing 52 during operation of the wave soldering machine. In turn, the actuator 56 is configured to receive commands from the controller 26 to cause the actuator 56 to adjust the orientation of the exit wing 52 during operation of the wave soldering machine.

In one embodiment, the exit wing 52 includes a first end 66 that is coupled to the nozzle core frame 40 by the hinge 54 and a second end 68 that is coupled to the actuator via two rotating links 70 of the linkage so the actuator 56 can cause the second end of the exit wing to rotate about the hinge 54 at the first end 66 of the exit wing 52. Rotating the exit wing 52 about the hinge 54 changes the flow of the solder wave passing over the exit wing 52. In particular, rotating the exit wing 52 so the second end 68 of the exit wing 52 moves upwardly causes the flow of the solder wave over the exit wing to decrease while rotating the exit wing 52 so the second end 68 of the exit wing 52 moves downwardly causes the flow of the solder wave over the exit wing to increase.

As mentioned above, the linkage allows the actuator to adjust an orientation of the exit wing 52 with respect to the nozzle core frame. In particular, the linkage allows longitudinal movement of the actuator arm 58 of the actuator 56 to adjust an angle of an upper surface 72 of the exit wing 52 with respect to a horizontal direction. The linkage includes the two rotating links 70, a cross bar 74, and the two connecting links 64. The two rotating links 70 couple the second end 68 of the exit wing 52 to the cross bar 74, which is in turn coupled to the actuator block 62 by the two connecting links 64.

Figure 6:
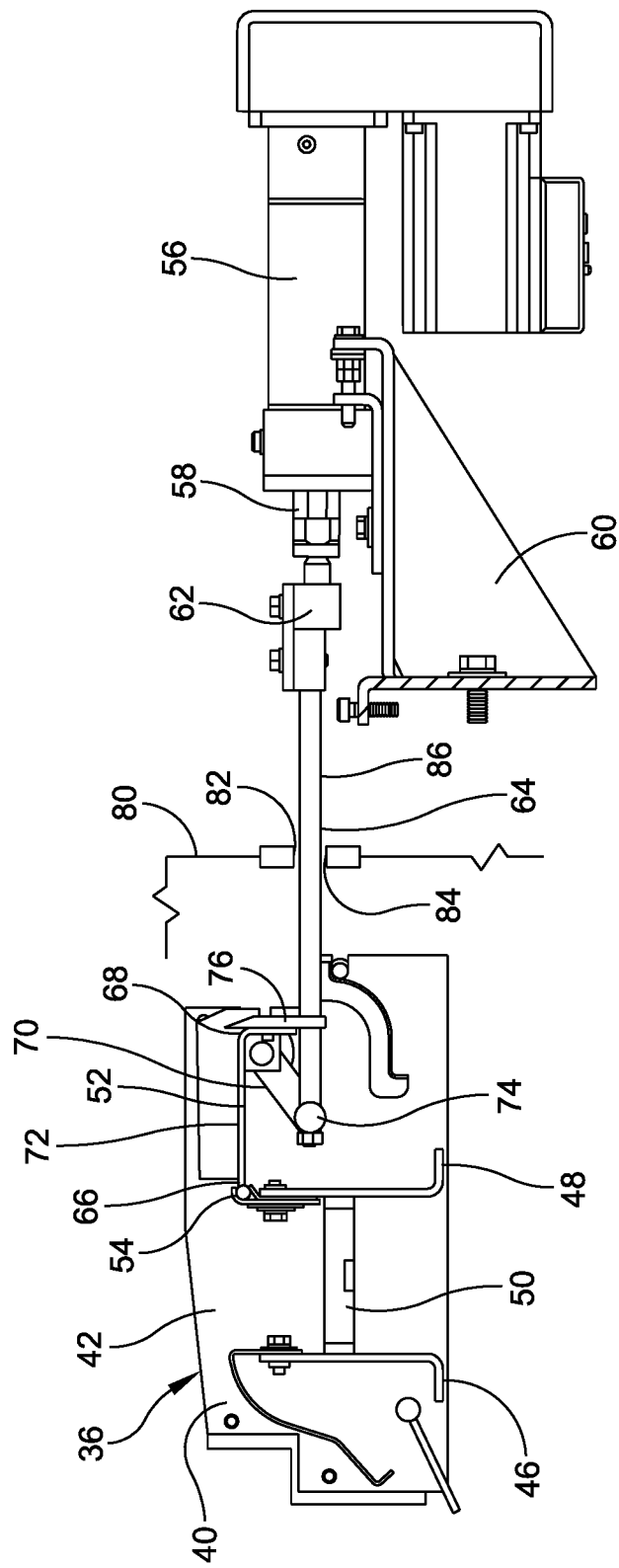
FIG. 6 is an elevational sectional view of the wave soldering station of FIG. 5, showing a portion of a shroud.

Each rotating link 70 has a first end that is rotatably coupled to the second end of the exit wing 52 and a second end that is rotatably coupled to the cross bar 74. The cross bar 74 extends perpendicularly to the rotating links 70. Each connecting link 64 has a first end that is coupled to the cross bar 74 and a second end that is coupled to the actuator block 62. The connecting links 64 extend perpendicularly to the cross bar 74 and parallel to the actuator arm 58. As shown in FIG. 6, when the upper surface 72 of the exit wing 52 extends substantially in a horizontal direction, the cross bar 74 is located beneath the exit wing 52 and longitudinally between the first end 66 of the exit wing 52 and the second end 68 of the exit wing 52.

The longitudinal displacement of the actuator arm 58 is able to cause the exit wing 52 to rotate about the hinge 54. An axial direction of the actuator arm 58 is parallel with an axial direction of each of the connecting links 64. Thus, the actuator arm 58 is configured to move the connecting links 64 along the horizontal direction along the axis of the direction of the actuator arm 58. Because the cross bar 74 is coupled to the connecting links 64, extension or retraction of the actuator arm 58 results in translation of the cross bar 74. Because the rotating links 70 are rotatably coupled to the cross bar 70 and because both the actuator 56 and the wave solder assembly 36 are secured to the solder pot 30, this translation of the cross bar 74 results in a rotation of the exit wing 52.

Figure 7:
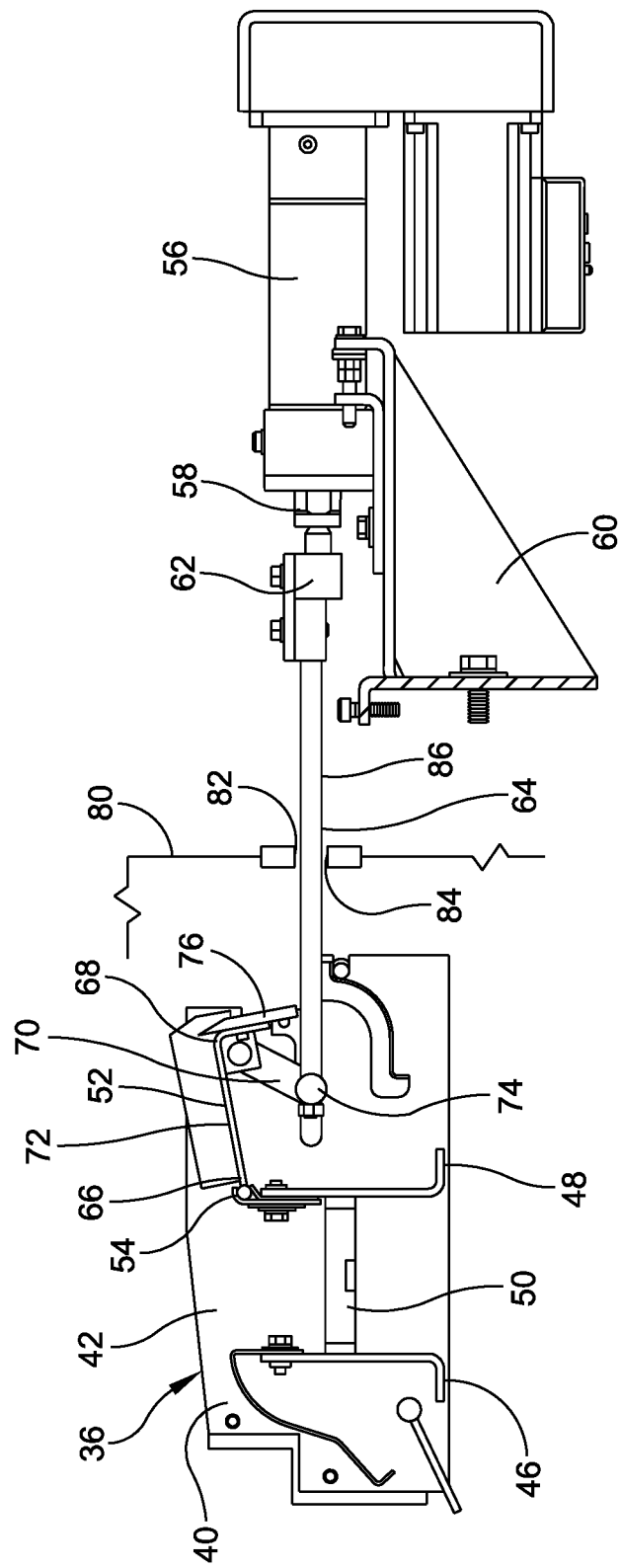
FIG. 7 is an elevational sectional view of the wave soldering station and shroud portion of FIG. 6, with an exit wing in a different orientation than in FIG. 6.

Referring particularly to FIGS. 6 and 7, the actuator arm 58 is shown in an extended position in FIG. 6 relative to the retracted position shown in FIG. 7. The second end 68 of the exit wing 52 is shown to be higher in FIG. 7 than in FIG. 6. A back gate 76 is secured to the second end 68 of the exit wing 52. The controller 26 is configured to adjust the orientation of the exit wing 52 to change the flow of solder over the back gate 76 of the exit wing. The controller 26 is configured to achieve optimum soldering characteristics of the wave nozzle assembly 36. Optimal soldering characteristics are achieved when there is no flow over the back gate 76 when the conveyor 16 is not carrying parts to be soldered, such as PCBs, over the wave solder assembly 36, but, once a PCB carried by the conveyor 16 enters the solder wave, the solder starts to flow over the back gate 76 at the same velocity as the velocity of the PCB along the conveyor 16. Once the PCB exits the wave, the solder flow over the back gate 76 stops again.

Figure 8:
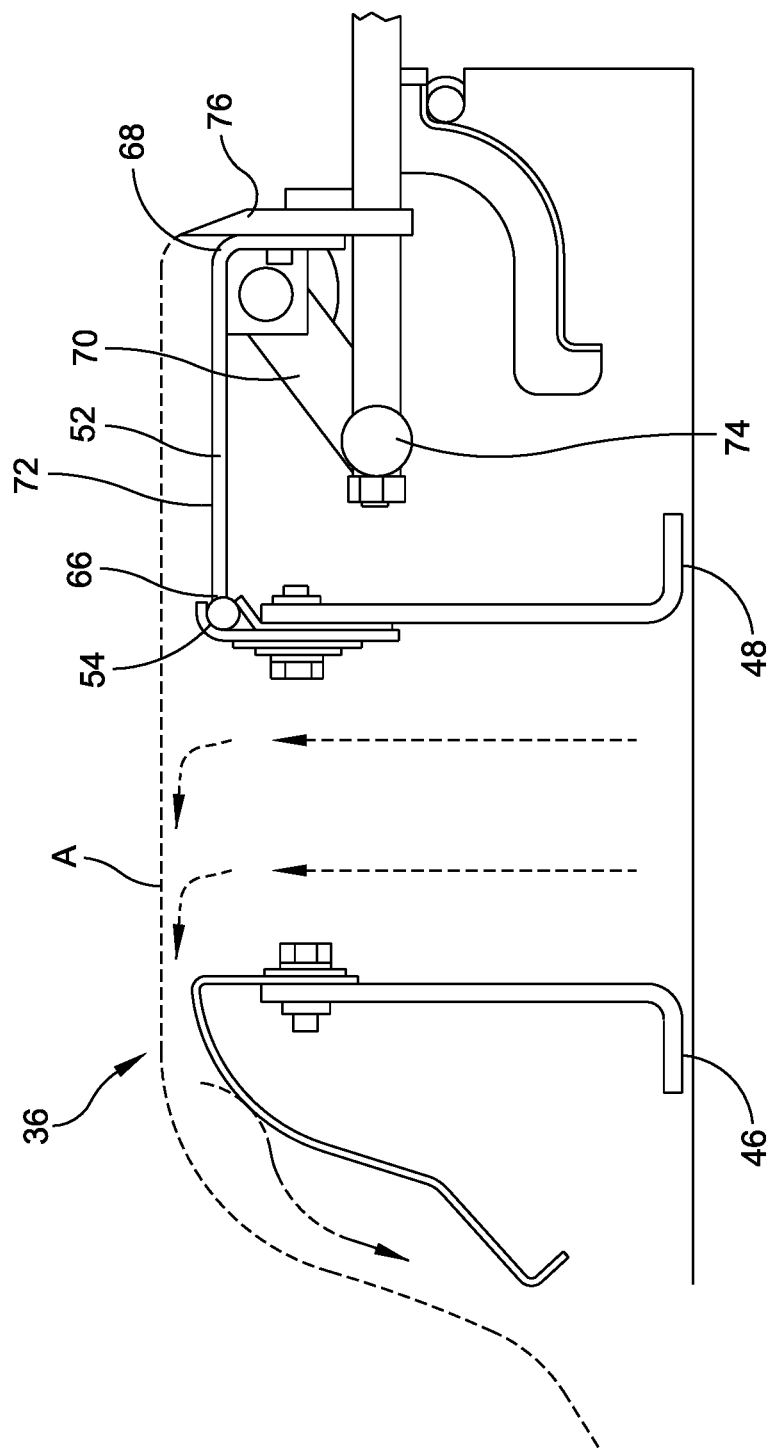
FIG. 8 is an elevational sectional view of flow through the wave solder nozzle assembly of FIG. 6 when no printed circuit boards (PCBs) are passing over the wave solder nozzle assembly.
Figure 9:
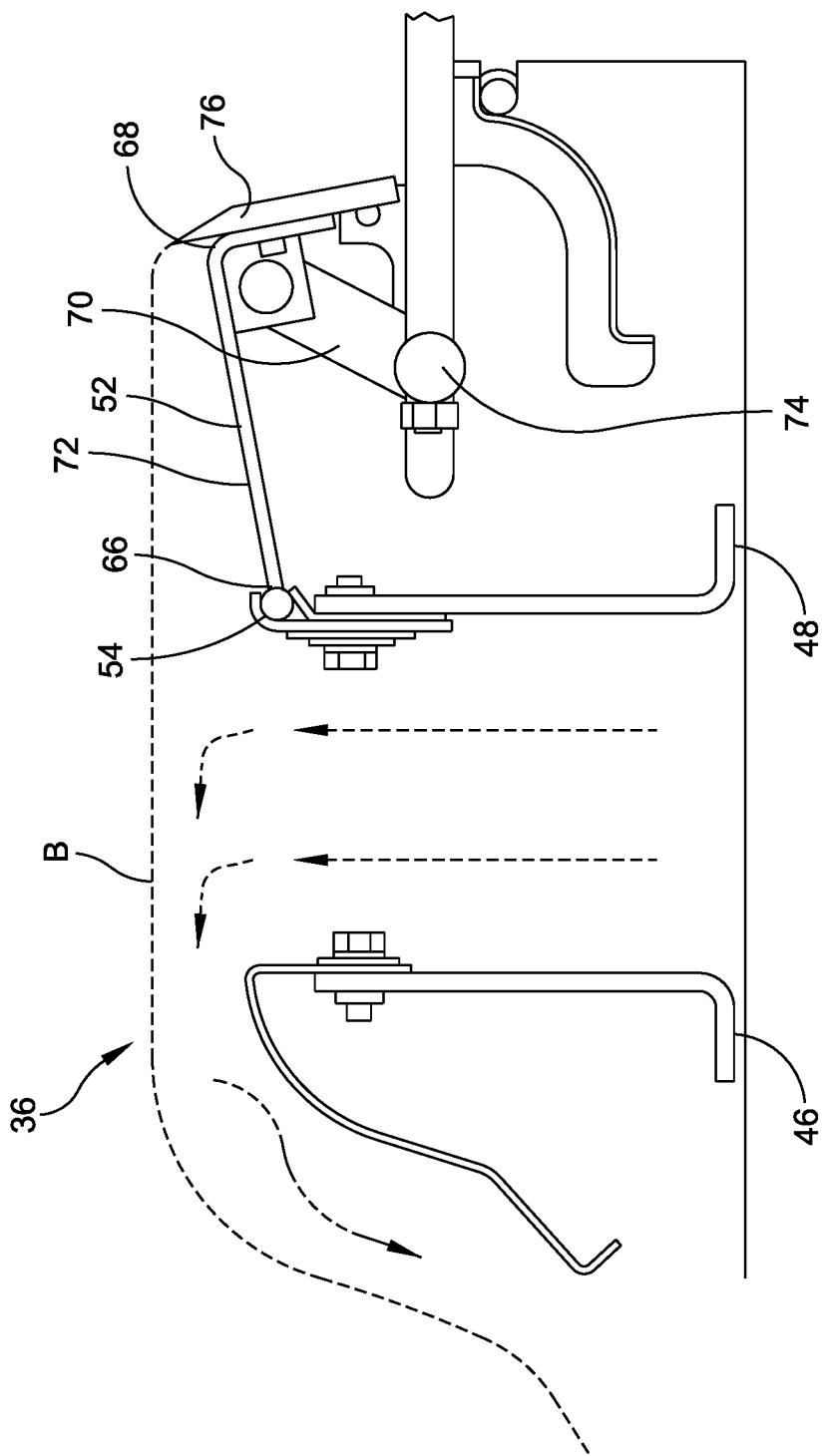
FIG. 9 is an elevational sectional view of flow through the wave solder nozzle assembly of FIG. 7 when no PCBs are passing over the wave solder nozzle assembly.

Due to the position of the actuator arm 58 in FIG. 6, the upper surface 72 of the exit wing 52 extends in a substantially horizontal direction, which yields a solder wave having a first flow over the exit wing. The broken line arrows in FIG. 8 show the direction of solder flow through the wave solder assembly 36 when no parts to be soldered, such as PCBs, are passing along the conveyor 16 and the actuator arm 58 is in the extended position of FIG. 6. The solder wave height in FIG. 8 is shown by the broken line A. In some embodiments, this solder wave height A is a minimum solder wave height of the wave solder assembly 36. Due to the position of the actuator arm 58 in FIG. 7, the upper surface 72 of the exit wing forms an angle with the horizontal direction that yields a solder wave having a second flow over the exit wing that is less than the first flow. The broken line arrows in FIG. 9 show the direction of solder flow through the wave solder assembly 36 when no PCBs are passing along the conveyor 16 and the actuator arm 58 is in the retracted position of FIG. 7. The solder wave height in FIG. 9 is shown by the broken line B. In some embodiments, this solder wave height B is a maximum solder wave height of the wave solder assembly 36.

Although the above description of solder flow relates to PCBs being carried by the conveyor 16, similar solder flow would occur for other parts to be soldered that are carried by the conveyor 16 over the wave solder nozzle assembly 36.

The orientations of the exit wing 52 that are shown in FIGS. 6 and 7 are just two examples of orientations of the exit wing 52. The rotational range of the exit wing 52 may be selected according to the desired performance parameters of the system, such as the desired range of wave heights. In various embodiments, the range of rotation of the exit wing 52 can extend beyond the orientations shown in FIGS. 6 and 7.

In some embodiments, the wave solder nozzle assembly 36 further includes a dross damper that is secured to the nozzle frame and configured to reduce turbulence as the solder travels back to the reservoir 32, thereby reducing solder balls that can form within the reservoir. One or more nitrogen tubes can be provided to create an inert atmosphere during the wave soldering process.

In some embodiments, a shroud 80, partially shown in FIGS. 6 and 7, extends around the wave solder nozzle assembly 36. In some embodiments, the shroud 80 surrounds the wave solder nozzle assembly to create a substantially gas impermeable, inert atmosphere surrounding the solder wave. In some embodiments, the shroud 80 is substantially nitrogen impermeable. The shroud 80 includes two sealed openings 82 through which the connecting links 64 extend. Each sealed opening 82 has an inner surface 84 that is in substantial sealing engagement with an outer surface 86 of a respective one of the connecting links 64. Because each connecting link 64 has a substantially constant cross section over a portion of the connecting link 64 that passes through the sealed opening 82, the connecting link 64 is able to substantially form a gas impermeable seal with the inner surface 84 of the respective sealed opening. In some embodiments, the inner surface 84 of each sealed opening 82 is annular and the outer surface 86 of each connecting link 64 has a matching circular profile so the inner surface 84 is in substantial sealing engagement with the outer surface 86 as each connecting link 64 moves along an axial direction of the connecting link 64 through the sealed opening 82.

The present disclosure also provides a method of adjusting a flow of a solder wave of a wave solder nozzle assembly of a wave soldering machine. In some embodiments, the method can be performed using the wave soldering station 24 or the wave soldering machine 10 including the wave soldering station 24 described above.

In some embodiments, the method comprises delivering solder material to the wave solder nozzle assembly 36 including the nozzle core frame 40 and an exit wing 52 hingedly attached to the nozzle core frame 40, adjusting the flow of the solder wave by causing the linear actuator 56 connected to the exit wing 52 to adjust the orientation of the exit wing 52 with respect to the nozzle core frame 40, and performing a wave soldering operation on a printed circuit board.

In some embodiments, adjusting the flow of the solder wave is achieved by rotating the exit wing 52 with respect to the nozzle core frame 40 by the linkage coupled to the linear actuator 56 and the exit wing 52. In some embodiments, the linkage includes the connecting links 64 and the rotating links 70, and the method includes causing translational movement of the connecting links 64 along an operational axis of the linear actuator 56 to cause a rotation of the rotating links 70.

In some embodiments, the method includes creating a substantially gas impermeable atmosphere over the solder wave. In some embodiments, this is accomplished by the shroud 80 that surrounds the wave soldering station 24. The shroud 80 includes at least one sealed opening 82 through which a respective connecting link 64 of the linkage extends. In some embodiments, the shroud 80 includes two sealed openings 82. A first one of the connecting links 64 extends through a first one of the sealed openings 82 and a second one of the connecting links 64 extends through a second one of the sealed openings 82. The inner surface 84 of each sealed opening 82 is in substantial sealing engagement with the outer surface 86 of the respective connecting link 64.

In some embodiments of the method, the actuator 56 is coupled to the controller 26 to control the movement of the linear actuator 56.

As used herein, "solder wave height" describes a vertical dimension of the solder wave.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A wave soldering machine to perform a wave soldering operation on a printed circuit board, the wave soldering machine comprising:
a housing;
a conveyor coupled to the housing, the conveyor being configured to deliver a printed circuit board through the housing; and
a wave soldering station coupled to the housing, the wave soldering station including a reservoir of solder material, and a wave solder nozzle assembly configured to create a solder wave, the wave solder nozzle assembly having a nozzle core frame and an exit wing, the exit wing being rotatable about a hinge with respect to the nozzle core frame to adjust a flow of a solder wave, the wave solder nozzle assembly further having a linear actuator connected to the exit wing and configured to adjust an orientation of the exit wing with respect to the nozzle core frame,
wherein the linear actuator is connected to the exit wing by a linkage,
wherein the exit wing includes a first end coupled by the hinge to the nozzle core frame and a second end, and wherein the linkage includes at least one rotating link having a first end rotatably coupled to the second end of the exit wing and a second end that is rotatably coupled to an actuator arm of the linear actuator, and
wherein the linkage further includes a cross bar extending perpendicularly to and being rotatably coupled to the at least one rotating link, and at least one connecting link coupling the cross bar to the actuator arm and extending perpendicularly to cross bar.

2. The wave soldering machine of claim 1, wherein the at least one connecting link is connected to the actuator arm by an actuator block.

3. The wave soldering machine of claim 1, wherein the at least one rotating link is two rotating links and the at least one connecting link is two connecting links.

4. The wave soldering machine of claim 1, further comprising a controller in communication with the linear actuator and configured to cause the linear actuator to adjust the orientation of the exit wing during operation of the wave soldering machine.

5. A wave soldering machine to perform a wave soldering operation on a printed circuit board, the wave soldering machine comprising:
a housing;
a conveyor coupled to the housing, the conveyor being configured to deliver a printed circuit board through the housing;
a wave soldering station coupled to the housing, the wave soldering station including a reservoir of solder material, and a wave solder nozzle assembly configured to create a solder wave, the wave solder nozzle assembly having a nozzle core frame and an exit wing, the exit wing being rotatable about a hinge with respect to the nozzle core frame to adjust a flow of a solder wave, the wave solder nozzle assembly further having a linear actuator connected to the exit wing and configured to adjust an orientation of the exit wing with respect to the nozzle core frame; and
a substantially gas impermeable shroud that surrounds the wave soldering station and includes at least one sealed opening through which at least one connecting link extends, each sealed opening having an inner surface that is in substantial sealing engagement with an outer surface of a respective connecting link of the at least one connecting link.

6. A wave solder nozzle assembly for a wave soldering station configured to perform a wave soldering operation on a printed circuit board, the wave solder nozzle assembly comprising:
a nozzle core frame;
an exit wing coupled to the nozzle core frame, the exit wing being rotatable about a hinge with respect to the nozzle core frame to adjust a flow of a solder wave; and
a linear actuator connected to the exit wing and configured to adjust an orientation of the exit wing with respect to the nozzle core frame,
wherein the linear actuator is connected to the exit wing by a linkage,
wherein the exit wing includes a first end coupled by the hinge to the nozzle core frame and a second end, and wherein the linkage includes at least one rotating link having a first end rotatably coupled to the second end of the exit wing and a second end that is rotatably coupled to an actuator arm of the linear actuator, and
wherein the linkage further includes a cross bar extending perpendicularly to and being rotatably coupled to the at least one rotating link, and at least one connecting link coupling the cross bar to the actuator arm and extending perpendicularly to cross bar.

7. The wave solder nozzle assembly of claim 6, wherein the at least one connecting link is connected to the actuator arm by an actuator block.

8. The wave solder nozzle assembly of claim 6, wherein the at least one rotating link is two rotating links and the at least one connecting link is two connecting links.

9. The wave solder nozzle assembly of claim 6, wherein the linear actuator is configured to receive commands from a controller to cause the linear actuator to adjust the orientation of the exit wing during operation of the wave soldering machine.

10. A wave solder nozzle assembly for a wave soldering station configured to perform a wave soldering operation on a printed circuit board, the wave solder nozzle assembly comprising:

a nozzle core frame;

an exit wing coupled to the nozzle core frame, the exit wing being rotatable about a hinge with respect to the nozzle core frame to adjust a flow of a solder wave; and a linear actuator connected to the exit wing and configured to adjust an orientation of the exit wing with respect to the nozzle core frame, wherein the linear actuator is connected to the exit wing by a linkage, wherein the exit wing includes a first end coupled by the hinge to the nozzle core frame and a second end, and wherein the linkage includes at least one rotating link having a first end rotatably coupled to the second end of the exit wing and a second end that is rotatably coupled to an actuator arm of the linear actuator, wherein the linkage further includes a cross bar extending perpendicularly to and being rotatably coupled to the at least one rotating link, and at least one connecting link coupling the cross bar to the actuator arm and extending perpendicularly to cross bar, wherein the at least one rotating link is two rotating links and the at least one connecting link is two connecting links, and wherein the shroud is a substantially gas impermeable shroud that surrounds the wave soldering station and includes at least one sealed opening through which the at least one connecting link extends, each sealed opening having an inner surface that is in substantial sealing engagement with an outer surface of a respective one of the connecting links.

11. A method of adjusting a flow of a solder wave of a wave solder nozzle assembly of a wave soldering machine, the method comprising:

delivering solder material to a wave solder nozzle assembly including a nozzle core frame and an exit wing hingedly attached to the nozzle core frame;

adjusting a flow of the solder wave by a linear actuator connected to the exit wing to adjust an orientation of the exit wing with respect to the nozzle core frame, the adjusting the flow of the solder wave being achieved by rotating the exit wing with respect to the nozzle core frame by a linkage coupled to the linear actuator and the exit wing;

performing a wave soldering operation on a printed circuit board; and creating a substantially gas impermeable atmosphere over the solder wave by the shroud that surrounds a wave soldering station that includes the wave solder nozzle assembly, the shroud including at least one sealed opening through which the at least one connecting link of the linkage extends, each sealed opening having an inner surface that is in substantial sealing engagement with an outer surface of a respective one of the connecting links.

* * * * *